United States Patent [19]

Castleberry

[11] 4,102,184

[45] Jul. 25, 1978

[54] TIRE PRESSURE AND MATE CHECK

[76] Inventor: Billy J. Castleberry, P.O. Box 647, Lubbock, Tex. 79408

[21] Appl. No.: 734,550

[22] Filed: Oct. 21, 1976

[51] Int. Cl.² ............................................. B60C 23/06
[52] U.S. Cl. ................................................ 73/146.2
[58] Field of Search ................ 73/146, 146.2, 146.3, 73/81, 85; 340/58; 177/134; 116/34 A

[56] References Cited

U.S. PATENT DOCUMENTS

| 1,670,685 | 5/1928 | Marks | 73/81 |
|---|---|---|---|
| 2,251,803 | 9/1941 | Pummill | 73/146 |
| 2,313,156 | 3/1943 | Kratt, Jr. | 73/146 |
| 2,384,437 | 9/1945 | Boynton | 73/81 |
| 2,807,161 | 9/1957 | Wirant | 73/146.2 |
| 3,019,642 | 2/1962 | Gallagher | 73/146 |
| 3,735,344 | 5/1973 | Weintraub et al. | 340/58 |

*Primary Examiner*—Donald O. Woodiel
*Attorney, Agent, or Firm*—Wendell Coffee

[57] ABSTRACT

A truck is driven along a driveway at a slow speed to check the tires. Each tire of each dual pair is weighed to determine if each tire is applying the same pressure against the ground. If mismatch is discovered, an alarm is actuated.

To check the pressure, a probe is pushed against the sidewall. From the measured stress-strain relationship, the inflation is determined.

28 Claims, 7 Drawing Figures

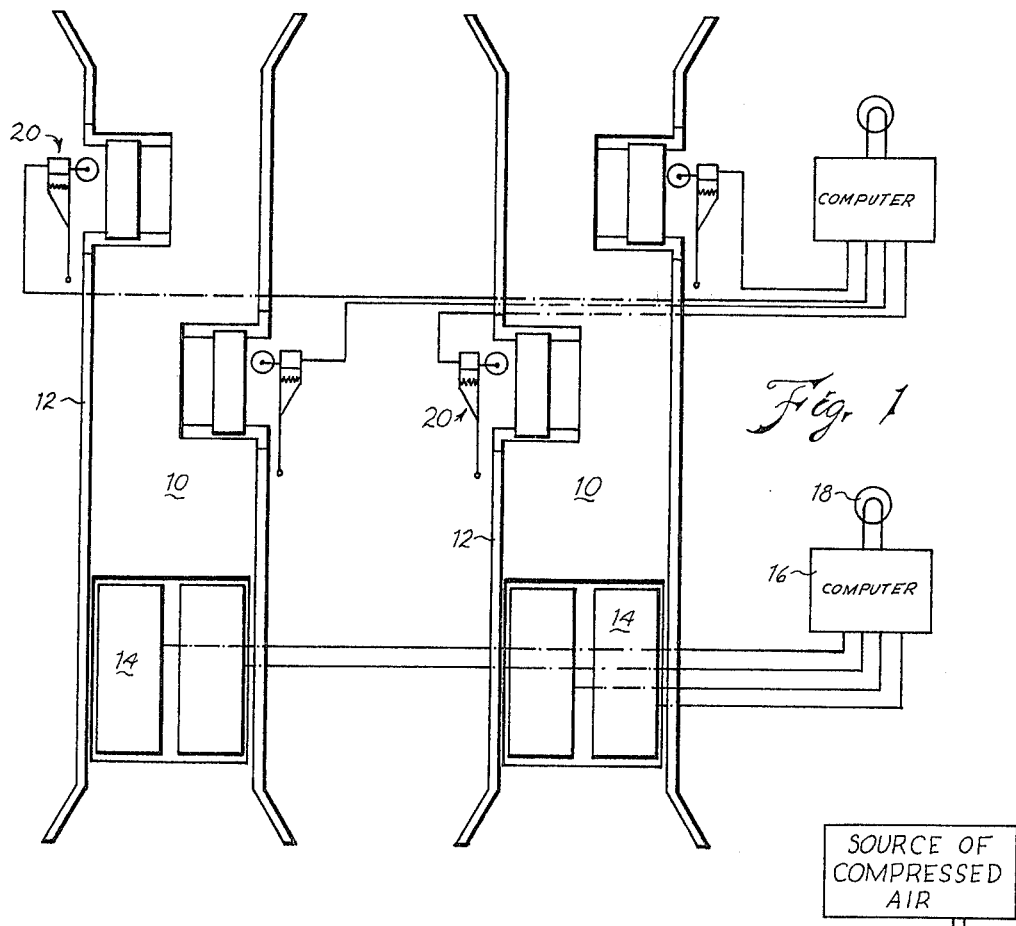
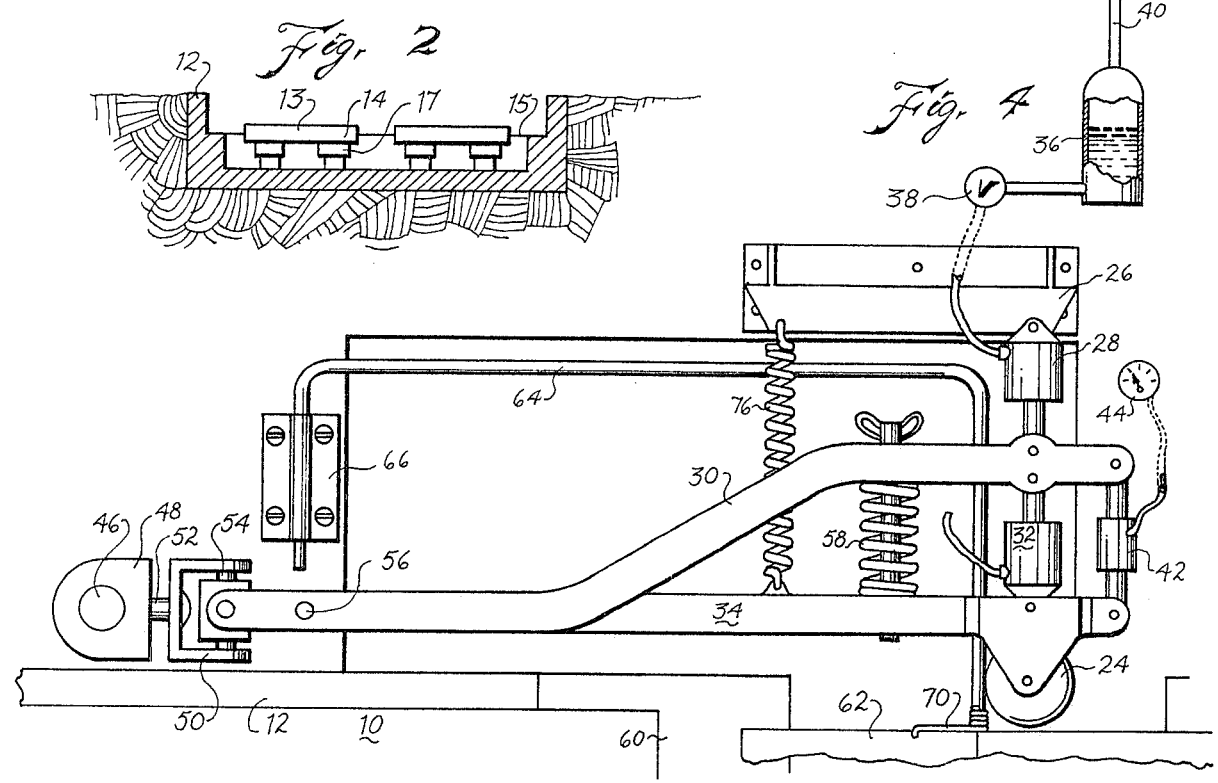

TIRE PRESSURE AND MATE CHECK

BACKGROUND OF THE INVENTION (1) Field of the Invention

This invention relates to in situ tire inflation inspection and in situ inspection of the tire mate.

(2) Description of the Prior Art

A common problem with dual truck tires is mismate or wrong tire pressure. Because of wear or recapping or mating biased and radial ply tires or other reasons, it is possible for two tires to have the same pressure in a dual pair, but still be mismated. In the event of mismating, one of the tires will carry most of the weight. Because of this excess weight, it will tend to over heat and wear excessively.

Because of the dual relationship of the tires, if one tire is properly inflated, it is difficult to determine whether the other tire is also properly inflated. Inasmuch as many truck-trailer combinations have 18 tires on the ground, it is time consuming to check the pressure of all the tires using a conventional hand gauge. Commonly to get some estimate and to make certain that there is not a deflated tire, often a check will be made by hitting each of the tires with a hammer and from the resiliency of the tire reflected by the bounce of the hammer, a determination is made if the tire is uninflated. However, excessive wear will result if either or both tires is substantially over or under inflated.

The problem of testing the inflation of each tire of a dual pair has been recognized.

Previous workers in the field have suggested that probes could be mounted into a roadway to push against the peripheral face, i.e., the tread of the tire. The amount of deflection or the different pressure between the center of the tread and the edge of the tread was taken as an indication of the inflation. JEHLE, U.S. Pat. Nos. 3,715,720; KRATT, 2,313,156.

Others have used a plurality of spring biased slats and the deflection (or weight) was taken as an indication of tire inflation. MORRIS, U.S. Pat. No. 1,849,730.

Other workers in the field, seeking to test the sidewall for defects, have used rollers along the sidewall of the tire. However, as it is understood, these persons who use rollers on the sidewall were not seeking to determine the inflation of the tire, but were seeking to detect sidewall defects. PUMMILL, U.S. Pat. Nos. 2,251,803; VEALS, 3,303,571.

SUMMARY OF THE INVENTION (1) New and Different Function

I have discovered that a more accurate check can be made upon the inflation of the tire by probing the sidewall of the tire and determining the stress-strain relationship as a result of this sidewall probing or deflection.

I have developed a complete station for both checking the mismatch of the tires and the inflation of the tires. The complete station is on a driveway so that a truck can be driven slowly along the driveway while both checks are being made without stopping the truck.

The mismatch check is made by placing scales in the surface of the driveway so that the force exerted upon the roadway by each tire is measured individually. If the tires of a dual pair exert substantially different forces, the tires are mismatched or one or both of the tires are incorrectly inflated.

As the truck proceeds along the special driveway, one of the tires, e.g., the inside tire, is supported on the level runway while the other tire, e.g., the outside tire, runs through a rocking cradle over a depression. The cradle will position itself along the tire and, therefore, when the cradle reaches the level position, this indicates that the axle of the wheel is centered above the cradle. The cradle being lightly spring mounted over the depression, there will be no load on the outside tire, the tire being inflation checked. At the point when the axle is centered, a probe pushes against the sidewall of the tire deflecting the sidewall of the tire. Thus, the stress-strain relationship is determined. The probe is quickly removed as the tire moves forward. From the stress-strain relationship of the deflection of the sidewall, the inflation of the tire is determined.

The proper inflation of the tire is known; therefore, if the measured inflation deviates from what is proper, an alarm is actuated.

On sophisticated systems, all of the weights and inflations could be printed for each of the tires of the truck so that a complete record is made. Basically, the measurement system does not depend upon the tire size and, therefore, the system is adaptable to be used at truck stops where a variety of trucks frequent. Certainly at trucking terminals where the trucks are routinely serviced, the tires of any fleet would normally be the same.

My invention will check within tolerable accuracy either bias or radial tires.

The system is also adaptable to single tires, such as on automobiles. Normally automobile tires vary greatly, but on a given fleet, such as police cars or taxi cabs, where all the tires are about the same and the weight of the vehicles are about the same it is possible to test the tires with a load on them inasmuch as if the load is substantially constant the relationship is about the same.

Thus it may be seen that my invention checks for improper inflation, as well as mismating. Previously both have not been accomplished at a single checking station. Also, tire inflation is checked in a completely new and different way by determining the stress-strain relationship on the sidewall of the tire while the tire is in a "no-load" condition. Therefore, in this regard, the combination of the various parts result in something greater than the sum of the individual functions of each of the parts individually.

(2) Objects of the Invention

An object of this invention is to check tires in situ.

Another object of this invention is to check the inflation of dual pairs of tires in situ.

Still another object of this invention is to check mating of dual pairs of tires in situ.

Further objects are to achieve the above with a device that is sturdy, compact, durable, lightweight, simple, safe, efficient, versatile, and reliable, yet inexpensive and easy to manufacture, install, adjust, operate, and maintain.

Other objects are to achieve the above with a method that is versatile, rapid, efficient, and inexpensive, and does not require highly skilled people to install, adjust, operate, and maintain.

The specific nature of the invention, as well as other objects, uses, and advantages thereof, will clearly appear from the following description and from the accompanying drawing, the different views of which are not to the same scale.

BRIEF DESCRIPTION OF THE DRAWING

FIG. 1 is a plan view skematically showing an embodiment of my invention.

FIG. 2 is a sectional view of the scales taken on line 2—2 of FIG. 1, with some parts schematically shown.

FIG. 4 is a plan view of said side wall pushing device.

DESCRIPTION OF THE PREFERRED EMBODIMENTS

Figure 3:
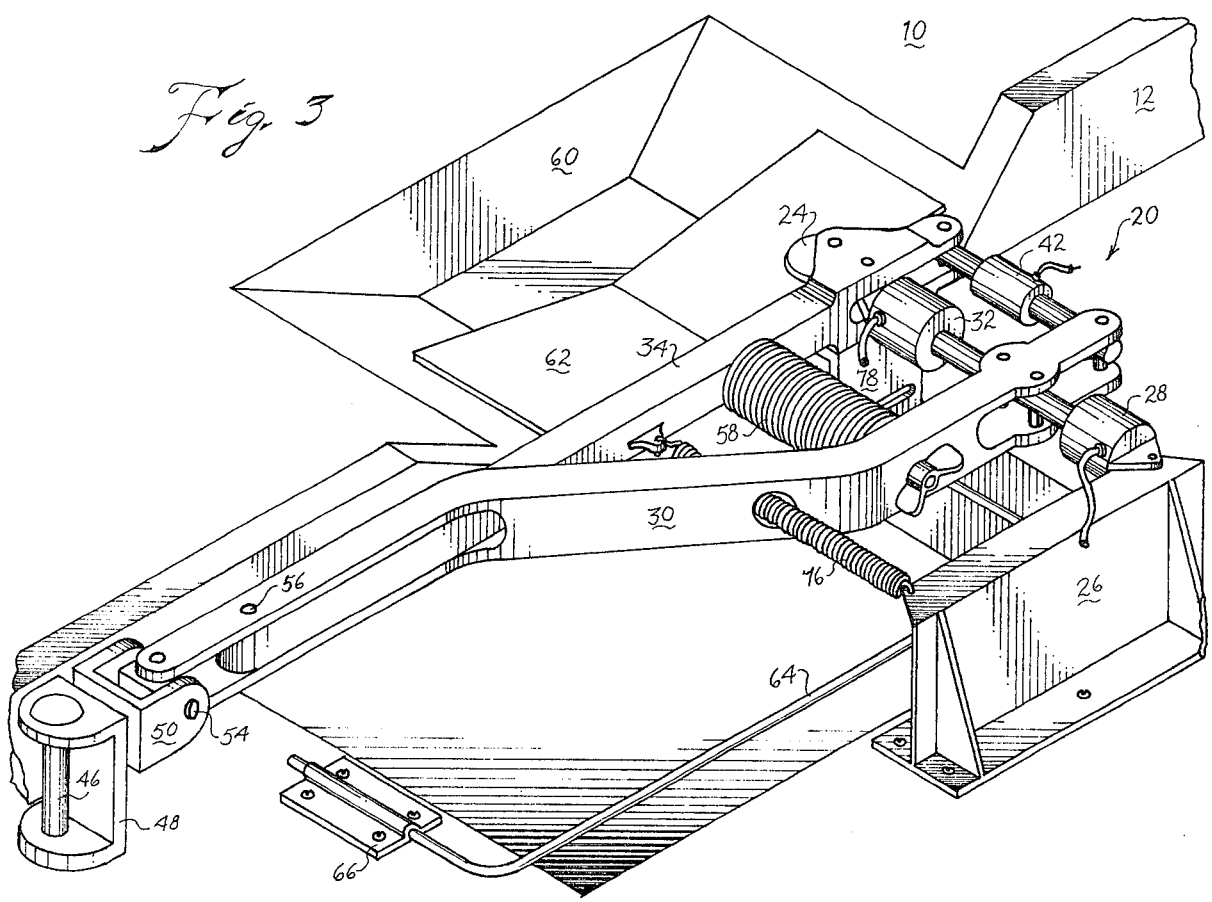
FIG. 3 is a perspective view of side wall pushing device. The tire and rim are shown in phantom lines.
Figure 5:
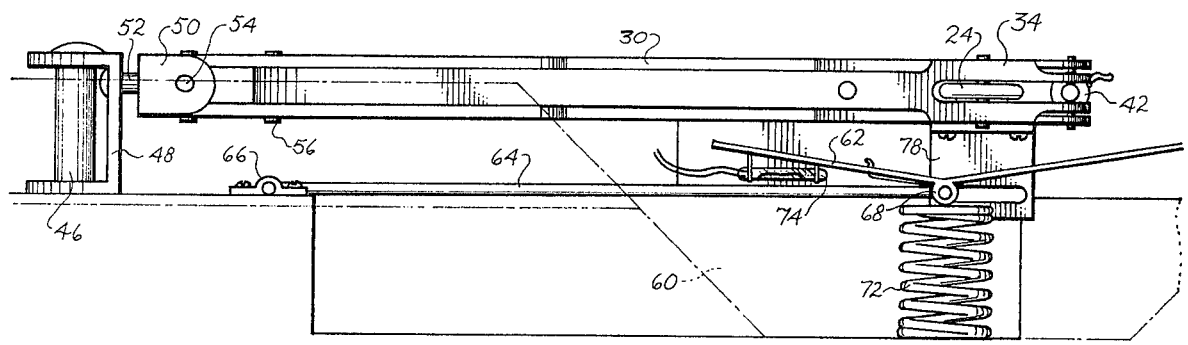
FIG. 5 is an elevational view of the side wall pushing device as viewed from the driveway with the driveway shown in phantom lines.

Referring more particularly to the drawing, there may be seen illustrated driveway 10 wherein the testing station is located. From a commercial standpoint, I prefer that the various parts of the testing station be made of metal and bolted together. These bolted sections are to be placed on a level concrete driveway and anchored to the driveway. Therefore, the testing station may be moved from one location to another rather easily. From a technical standpoint, the parts could be mounted in concrete. However, this makes it far more difficult to move the station. The term "driveway", as used in this specification, refers either to the metal portions, or to the concrete portions, as appropriate. Guide rails 12 project from the driveway to guide the vehicle tires to a correct position and alignment with respect to the measuring devices. Guide rails are well known and will not be discussed further.

Four scales 14 are mounted in the driveway aligned directly across it, adjacent to the guide rails 12. These scales are spaced from the guide rails and from one another so that the scales 14 will weigh simultaneously all four tires upon their axles, i.e., the dual pairs on opposite sides of the vehicle. Although the placement of the tires may not be exactly the same on different vehicles, they will be near enough in the same location so they can be weighed by the individual scales.

The weighing devices are herein called "scales". It will be understood that it is possible to use plates with transducers 17 thereunder so that a very simple direct means is used to read the force exerted by the tires on the plates as they are driven slowly over them. This operation is analogous to weighing the tires. Thus, the scales 14 may be set so their tops 13 project slightly above the driveway surface 15. Also, the weight determination is made electrically so that the results are automatically processed by computer. The weights of the pair can be compared to determine if one tire weighs substantially more than the other. E.g., if one tire of a pair weighs 300 kg more than the other, it is apparent either that one of the tires is incorrectly inflated or that the tires are mismatched. In either event an indicator or alarm is actuated. The computer connected to the scales is shown schematically by box 16 and the alarm by light 18. The computer is means for connecting each of the two scales of a pair to the indicator or alarm for actuating the indicator or alarm responsive to the scales indicating the tires differ from each other in weight more than a preset amount. The alarm could be a printed indication of individual weight or of difference in weight.

Sidewall pushing devices 20 are mounted on the driveway at various distances from the scales 14. The sidewall pushing device is the device which measures tire inflation pressure by deflecting the sidewall and simultaneously determining the stress-strain relationship of the tire sidewall. Specifically, each of the pushing devices is the means by which probe 24 is attached to the driveway 10. Buttress 26 is rigidly mounted into the driveway. Base hydraulic cylinder 28 is mounted between the buttress 26 and base bracket 30. Incremental fluid cylinder 32 is connected between the base bracket 32 and the probe 24. Guide bracket 34 interconnects the probe and the fluid cylinder 32.

When the tire is opposite the probe 24, the base hydraulic cylinder 28 is expanded to move the probe into base position. The base position of the probe is the position of the probe 24 firmly against the sidewall of the tire, but not deflecting the sidewall a substantial amount. Three millimeters (⅛th inch) is considered to be a deflection of a not substantial amount.

The preferred means for operating the base cylinder 28 is to use chamber 36 which contains, primarily, a noncompressible liquid such as hydraulic fluid. The chamber 36 is connected by valve 38 to the base hydraulic cylinder 28. Customarily, conduits such as hoses are used for these connections. If the valve 38 is open and air pressure induced through pipe 40 into the top of the chamber 36, it may be seen that the probe will be brought into the base position against the tire's sidewall. The determination of the correct air pressure to be used on the pipe 40 to achieve this result may be calculated readily. Thereafter if the valve 38 is closed, the noncompressible liquid will be locked into the base hydraulic cylinder 38 so that the base bracket 30 is rigidly positioned with respect to the buttress 26. Thus, I have positioned the probe 24 in base position against the sidewall of the tire.

From this base position, the probe 24 is pushed into the sidewall by a predetermined push. This predetermined push may be by either a predetermined stress or a predetermined strain. I call it Mode I wherein a predetermined stress is chosen. In Mode I, a fluid pressure of a fixed amount is connected to the incremental hydraulic cylinder 32. In Mode I, I prefer to use a stress which will cause the probe to move an incremental amount of about 6 to 10 millimeters. For any given probe dimension and given normal inflation of the tire, the pressure necessary to cause this incremental deflection of the tire may be readily determined. With stress so determined, the exact strain or movement of the probe 24 is readily determined by strain measuring device 42 mounted between the base bracket 30 and the guide bracket 34.

In Mode I, the stress is known and is always the same (the pressure applied by the incremental hydraulic cylinder 32). The result of the stress will be strain or deflection, measured by the strain measuring device 42, and will be inversely proportional to the inflation of the tire. Therefore, inflation pressure gauge 44 is the deflection gauge which is calibrated directly in pressure units.

It will be apparent to those skilled in the art that another mode of operation would be to always apply a standard strain upon the sidewall and measure the resulting stress. I call this Mode II operation wherein a fixed amount of fluid is pushed into the incremental hydraulic cylinder 32. A positive displacement pump would displace the desired fixed amount of fluid for each stroke. Therefore, each stroke would cause the probe 24 to move the same amount, which would be some preferred amount between 6 and 10 millimeters. A transducer or other stress measuring device is mounted between the probe and the guide bracket 34. In Mode II, the strain always being the same, the inflation pressure will be measurable resultant stress. Again, a gauge can be calibrated to read inflation pressure directly.

It is emphasized in either mode, the stress-strain relationship of the deflection of the sidewall of the tire is determined and from the stress-strain relationship the inflation pressure of the tire is determined.

I prefer to use a wheel as the probe 24. I have had good success using a wheel about 20 centimeters in diameter and about 5 centimeters thick. The periphery of the wheel is arcuate. The preferred form of the periphery is semicircular in section as more clearly seen in FIG. 7.

If a probe of smaller diameter is used, sometimes difficulty is experienced because of the uneven nature of the sidewalls, particularly with radial tires. I have found that radial tires often have irregular surfaces and I have had better success using a wheel which extends along sidewall for a considerable distance.

With a probe of the character described, I have been able to measure the inflation pressure within tolerable accuracy for either bias or radial tires without making any change of the equipment. I.e., as the tire is brought before the device, operation of the device will correctly read the pressure without changing any of the calibrations regardless of whether the tire is a radial or a bias tire. By a tolerable accuracy I mean accuracy sufficient for commercial purposes. A dual pair of tires will operate properly even though they may not be inflated to equal pressures. Accuracy within 5% is deemed commercially acceptable.

Vertical pintle 46 is mounted adjacent to path of the tires as determined by the guide rails 12. It is upstream from the probe 24, by that it is meant that the tires to be tested will pass the pintle 46 before reaching the probe 24. Sleeve 48 is mounted on the pintle. Yoke 50 is attached to the sleeve 48 by horizontal bolt 52. The yoke 50 may be adjusted about the horizontal axis of the bolt 52. The base bracket 30 is hinged to the yoke by shaft 54. The guide bracket 34 is pivoted to the base bracket by pin 56. The pin 56 is normal to the shaft 54. Helical compression spring 58 extends between the base bracket and the guide bracket to exert pressure on the probe at the base position.

Figure 6:
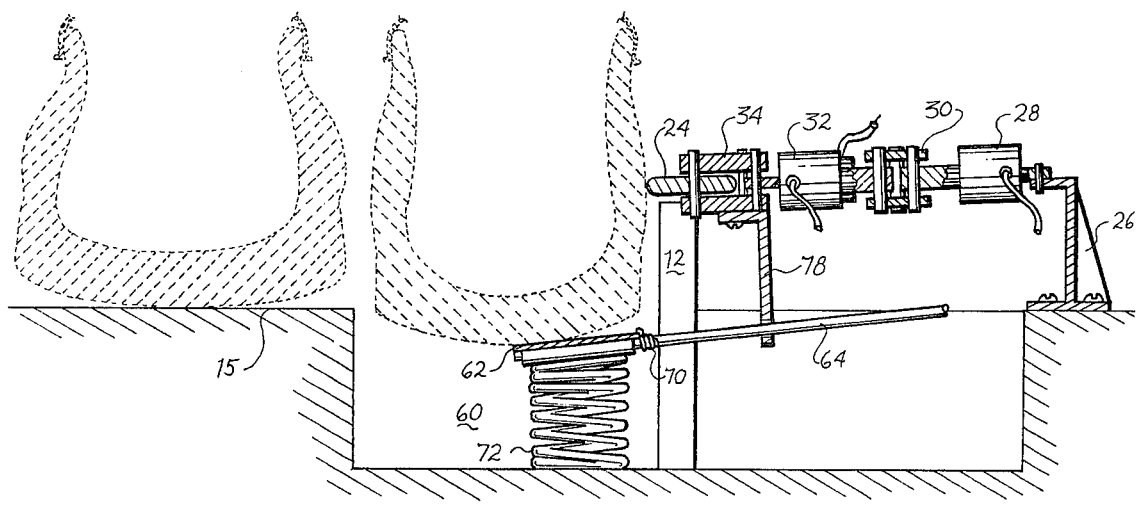
FIG. 6 is a sectional view taken substantially on line 6—6 of FIG. 4 and FIG. 5.

Referring to FIG. 6, I prefer to probe the sidewall of the tire between the rim of the wheel and the curb guard of the tire. On most truck tires the rim will be about 22 cm (9 inches) from the surface 15 of the driveway 10 and the curb guard of the tire will be about 12 cm (5 inches). Although these dimensions vary slightly among vehicles, my invention will accommodate most vehicles if the probe is about 17 cm above the surface of the driveway. The probe can be sightly higher or considerably lower. I have achieved fair accuracy while operating the probe in the area of the curb guard of the tire, but I prefer to operate the probe above this area.

As seen in FIG. 6, the sidewall at the preferred location is not vertical, but angles slightly from the curb guard to the rim. I prefer to push normal to the sidewall. Therefore, I prefer to set the yoke 50 to the sleeve 48 at a slight angle so that the pin 56 is parallel to the sidewall, i.e., the shaft 54 is at right angles to the sidewall. As stated, I prefer to push at right angles or normal to the sidewall, however, this is not critical. By having a semicircular periphery of the wheel which forms the probe 24, it may be seen that the probe will be pushing with the same area against the sidewall even though the angle of push is not precise. Basically, the push will be horizontal, but as indicated, it may be a slight angle downward from horizontal.

From a study of the elements by which the probe 24 is supported, it may be seen that the brackets as positioned do not transmit stress to the probe. The two cylinders 28 and 32 are aligned with the probe 24 from the buttress 26 and, therefore, the stress is transmitted through these elements and the brackets merely position the probe against the tire before the stress is exerted.

I have found it desirable to check the tires without axle load. Load distorts the sidewall. Therefore, preferably, depression 60 is located in the driveway opposite the probe 24. Only one tire of the dual pair enters the depression 60. The other tire of the dual pair supports the weight of the axle at this point and the dual tire being probed or checked has no axle load upon it.

It will be understood by those skilled in the art that if the vehicle to be checked were stopped with the axle aligned with the probe and if the pushers on the probe are manually activated, what has been described to this point would be an operative tester. However, it is desired that the station be able to check and test the tires if the vehicle is driven slowly along the driveway. By slowly, I mean a speed of about 3.6 km/hr (100 cm per second) (2.22 mph). If the check is made about ⅓rd the way from the tread to the axle (about 17 cm from the driveway surface), the speed of the sidewall at this point will be about 30 cm (12 inches per second).

Cradle 62 is positioned in the depression 60. The cradle is supported by a U-shaped loop 64 which is hinged to the driveway by hinges 66. The cradle is hinged to the loop by journals 68 which are parallel to the hinges 66 and which will be parallel to the axle of the wheel carrying the tire to be tested.

Torsion spring 70 holds the cradle or biases the cradle so that it tilts upstream, which is to say that the lip of the cradle adjacent or near the pintle 46 is tilted down nearly level with the surface 15 of the driveway. The cradle is supported by cradle spring 72 which keeps the cradle in firm contact with the tire to be tested, but does not place a load upon the tire. It is contemplated that the force exerted by the cradle spring against the tire would be less than 100 kg. Therefore, if the supporting tire is overinflated or underinflated, the cradle will still be firmly against the tire to be probed.

Mercury level switch 74 is mounted upon the bottom of the cradle 62. When the axle and the tire are in line with the probe 24, the cradle will be rocked to a level position and the level switch 74 will so indicate. The level switch will activate a suitable mechanism, (such as a solenoid which will be readily apparent to those skilled in the art). Then, the base cylinder will be pressurized, the base position determined and immediately thereafter the incremental push made upon the tire, the stress-strain relationship determined, the incremental push and the base pressure released. Tension spring 76 between the guide bracket and the buttress 26 will withdraw the probe from the tire.

This probing is conducted within 1/10th of a second while the tire moves only 3 cm (1¼ inches).

The guide bracket 34 is attached to the loop 64 adjacent to the cradle 62 by spacer 78. Therefore, regardless of the position of the tire tread with respect to the driveway surface 15, the probe will still be a preset distance above the tread.

Figure 7:
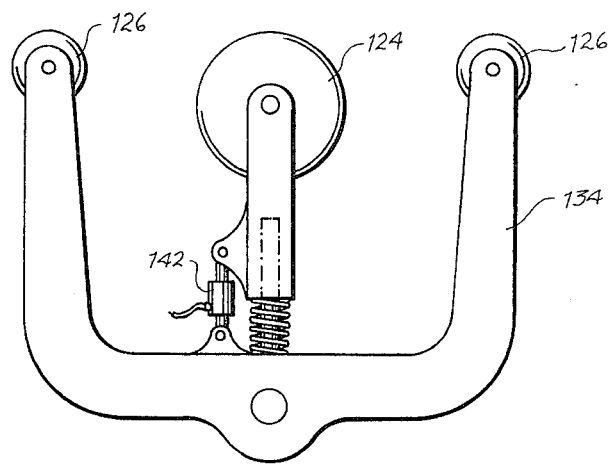
FIG. 7 is a plan view of a second embodiment of a probe assembly.

FIG. 7 shows a different probe assembly. In it there is an incremental probe 124 mounted between two base probes 126. The entire assembly is mounted on guide bracket 134. Strain Gauge 142 is between the probe 124 and the bracket 134. It will be understood that the operation of this unit is quite similar except that the base position is determined by bringing the two base probes, which may be in the form of rollers, firmly against the sidewall of the tire, but without appreciable deflection.

As an aid to correlating the terms of the claims to the exemplary drawing, the following catalog of elements is provided:

| 10 | driveway | 48 | sleeve |
|----|----------|----|--------|
| 12 | guide rails | 50 | yoke |
| 13 | top of scales | 52 | bolt |
| 14 | scales | 54 | shaft |
| 15 | driveway surface | 56 | pin |
| 16 | computer, scale | 58 | helical com. spring |
| 17 | scale transducer | | |
| 18 | alarm, scale | 60 | depression |
| 20 | pushing device | 62 | cradle |
| 24 | probe | 64 | loop |
| 26 | buttress | 66 | hinge |
| 28 | base, hy. cyl. | 68 | journals |
| 30 | base bracket | 70 | torsion spring |
| 32 | increm. fl. cylinder | 72 | cradle spring |
| 34 | guide bracket | 74 | level switch |
| 36 | chamber | 76 | tension spring |
| 38 | valve, base | 78 | spacer |
| 40 | pipe | 124 | probe, incremental |
| 42 | strain measure device | 126 | probe, base |
| 44 | infla. pres. gauge | 134 | guide bracket |
| 46 | pintle | 142 | strain measure device |

The embodiments shown and described above are only exemplary. I do not claim to have invented all the parts, elements or steps described. Various modifications can be made in the construction, material, arrangement, and operation, and still be within the scope of my invention. The limits of the invention and the bounds of the patent protection are measured by and defined in the following claims. The restrictive description and drawing of the specific example above do not point out what an infringement of this patent would be, but are to enable the reader to make and use the invention.

SUBJECT MATTER CLAIMED FOR PROTECTION

I claim as my invention:

1. A device for in situ determining the inflation pressure in a pneumatic tire having sidewalls comprising:
   a. a driveway for a vehicle having said tire,
   b. guide rails projecting upward from the driveway to guide the vehicle therealong,
   c. a cradle along the driveway in the path of said tire on the vehicle,
   d. a probe on a bracket,
   e. push means operatively associated with said probe for pushing the probe horizontally into the sidewall of a tire to be tested,
   f. measuring means operatively associated with said probe for measuring the results of the pushing inprobe indicative of inflation pressure of the tire, and
   g. said probe connected to said cradle.

2. The invention as defined in claim 1 with additional limitations of
   h. a fluid cylinder connecting the probe and bracket,
   j. strain means for interconnecting the probe and bracket to measure the movement of the probe relative to the bracket,
   k. said fluid cylinder being said push means, and
   m. said strain means being said measuring means.

3. A device for in situ determining the inflation pressure in pneumatic tires having sidewalls comprising:
   a. a bracket adapted to be mounted adjacent a tire to be tested,
   b. a probe mounted upon the bracket for horizontal movement,
   c. push means on the bracket for pushing the probe horizontally into the sidewall of a tire to be tested a predetermined incremental amount beyond a base position, the incremental push producing a measurable result, wherein
   d. said base position is defined as the position of the probe firmly against the sidewall but not deflecting the sidewall a substantial amount,
   e. measuring means on the bracket for measuring the result of the incremental push,
   f. said probe is in the form of a wheel,
   g. said wheel having a convex curved peripheral face.

4. A device for in situ determining the inflation pressure in pneumatic tires having sidewalls comprising:
   a. a bracket adapted to be mounted adjacent a tire to be tested,
   b. a probe mounted upon the bracket for horizontal movement,
   c. push means on the bracket for pushing the probe horizontally into the sidewall of a tire to be tested a predetermined incremental amount beyond a base portion, the incremental push producing a measurable result, wherein
   d. said base position is defined as the position of the probe firmly against the sidewall but not deflecting the sidewall a substantial amount,
   e. measuring means on the bracket for measuring the result of the incremental push,
   f. said bracket adjacent a driveway, and
   g. guide rails projecting upward from the driveway to guide tired vehicles therealong.

5. The invention as defined in claim 4 with additional limitations of
   k. a buttress mounted in the driveway,
   m. a hydraulic cylinder extending from said buttress to said bracket,
   n. a chamber containing noncompressible liquid,
   o. a conduit with a valve connecting said chamber to said cylinder,
   p. means for supplying air pressure to said chamber,
   q. said valve, cylinder and chamber forming a portion of means for positioning the probe into base position.

6. The invention as defined in claim 4 with additional limitations of
   k. a yoke connected to the driveway,
   m. said bracket mounted to said yoke,
   n. means for rotating said yoke about a horizontal axis, whereby
   o. said bracket and probe may be adjusted for movement so the horizontal movement of the probe is normal to the sidewall of the tire being tested.

7. A device for in situ determining the inflation pressure in pneumatic tires having sidewalls comprising:
   a. a bracket adapted to be mounted adjacent a tire to be tested,
   b. a probe mounted upon the bracket for horizontal movement,
   c. push means on the bracket for pushing the probe horizontally into the sidewall of a tire to be tested a predetermined incremental amount beyond a base position, the incremental push producing a measurable result, wherein d. said base position is defined as the position of the probe firmly against the sidewall but not deflecting the sidewall a substantial amount, e. measuring means on the bracket for measuring the result of the incremental push, f. a driveway adjacent said bracket, g. a depression in said driveway opposite said probe, whereby a pair of dual tires driven along said driveway will have one tire suspended over said depression.

8. The invention as defined in claim 7 with an additional limitation of o. guide rails projecting upward from the driveway to guide dual tired vehicles therealong.

9. The invention as defined in claim 8 further comprising:

p. a cradle in said depression, q. said cradle mounted for rocking, r. means upon said cradle to determine when said cradle is level.

10. The invention as defined in claim 9 with an additional limitation of p. two side-by-side scales set in the driveway for individually weighing each tire of a dual pair.

11. The invention as defined in claim 10 wherein said probe q. is in the form of a wheel, r. said wheel having a diameter greater than the thickness, s. said wheel having a semicircular peripheral face.

12. The invention as defined in claim 11 with additional limitations of t. a buttress mounted in the driveway, u. a hydraulic cylinder extending from said buttress to said bracket, v. a chamber containing noncompressible liquid, w. a conduit with a valve connecting said chamber to said cylinder, x. means for supplying air pressure to said chamber, y. said cylinder, valve and chamber forming a portion of means for positioning the probe into base position.

13. The invention as defined in claim 12 with additional limitations of z. a fluid cylinder connecting the probe and bracket, aa. strain means for interconnecting the probe and bracket to measure the movement of the probe relative to the bracket, bb. said fluid cylinder being said push means, and cc. said strain means being said measuring means.

14. The invention as defined in claim 13 with additional limitations of dd. a yoke connected to the driveway, ee. said bracket mounted to said yoke, ff. means for rotating said yoke about a horizontal axis, whereby gg. said bracket and probe may be adjusted for movement so the horizontal movement of the probe is normal to the sidewall of the tire being tested.

15. The method of checking pneumatic vehicle tires having sidewalls mounted as dual pairs upon an axle of a loaded vehicle comprising the steps of:

a. simultaneously individually weighing each tire of a dual pair, b. determining the difference between the weights, and c. activating an indicator if the difference is greater than a predetermined amount, d. thereafter moving the vehicle forward until one tire of the dual pair is over a depression, thus e. suspending one tire without load, f. radially pushing against one sidewall of the suspended tire a predetermined base amount, g. radially pushing against the tire a predetermined incremental amount in addition to the base amount, thus producing a measurable difference between the base and incremental amount, and h. measuring the difference resulting from between the base and incremental amount.

16. The method of in situ measuring the inflation of a pneumatic tire on a vehicle, the tire having sidewalls comprising the steps of:

a. moving the vehicle along a driveway, b. deflecting a sidewall of the tire by a probe as the tire rolls along the driveway, c. determining the stress-strain relationship of the deflection, and d. using the stress-strain relationship as a measure of inflation.

17. The invention as defined in claim 16 wherein the sidewall of the tire is deflected by d. a predetermined stress, and e. stress-strain relationship determined by measuring the strain resulting from said predetermined stress.

18. The invention as defined in claim 16 wherein the deflection is made without axle load on the tire.

19. The invention as defined in claim 18 with additional steps of:

d. simultaneously individually weighing each tire of a dual pair, e. determining the difference between the weights, and f. activating an alarm if the difference is greater than the predetermined amount.

20. The invention as defined in claim 19 wherein the sidewall of the tire is deflected by g. a predetermined stress, and h. stress-strain relationship determined by measuring the strain resulting from said predetermined stress.

21. The method of in situ determining with a probe the inflation pressure in a pneumatic tire on a vehicle, the tire having sidewalls comprising the steps of:

a. moving the vehicle along a driveway, b. establishing a base position which is a position of the probe firmly against the sidewall but not deflecting the sidewall a substantial amount as the tire rolls along the driveway, c. pushing the probe against the sidewall a predetermined incremental amount from the base position thus producing a measurable result as the tire rolls along the driveway, d. measuring the result of the pushing, and e. determining the pressure from said measurement.

22. The invention as defined in claim 21 with an additional limitation of e. supporting the tire so that it has no axle load on it while making the determination.

23. The invention as defined in claim 22 with additional steps of:

f. simultaneously individually weighing each tire of a dual pair, g. determining the difference between the weights, and h. activating an alarm if the difference is greater than the predetermined amount.

24. The invention as defined in claim 23 with additional limitations of j. first pushing with the base amount, and k. thereafter pushing with the incremental amount.

25. The invention as defined in claim 24 with an additional limitation of m. said base and incremental amount being pressure amount, and said difference being deflection.

26. The invention as defined in claim 25 wherein the measurement of the result of the pushing is by measuring the displacement of the probe relative to a mounting therefor.

27. The invention as defined in claim 26 wherein the probe is pushed a predetermined incremental amount by a fluid cylinder which is actuated by a predetermined pressure.

28. The invention as defined in claim 27 with an additional limitation of n. establishing a base position by pushing the probe against the sidewall with a predetermined pressure as exerted upon a hydraulic cylinder.

* * * * *